Feb. 3, 1970     E. T. DALTON     3,492,764
LENS GENERATING METHOD
Filed March 28, 1967     4 Sheets-Sheet 1
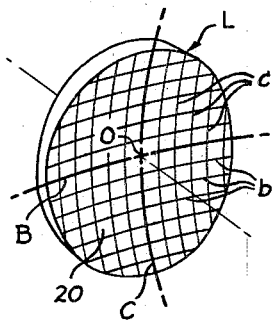
Fig. 1
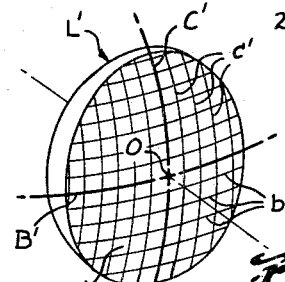
Fig. 2
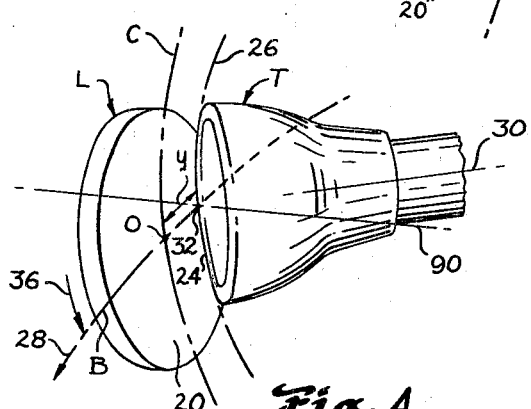
Fig. 3
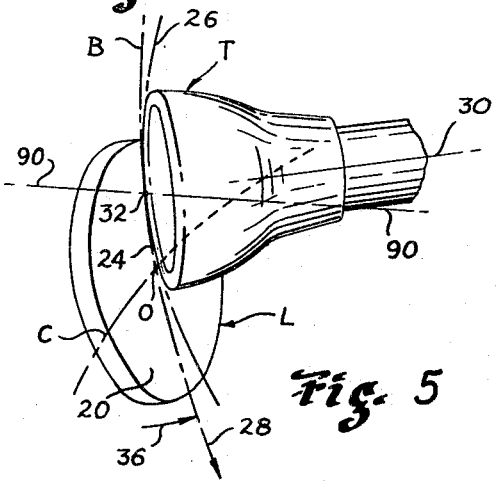
Fig. 4
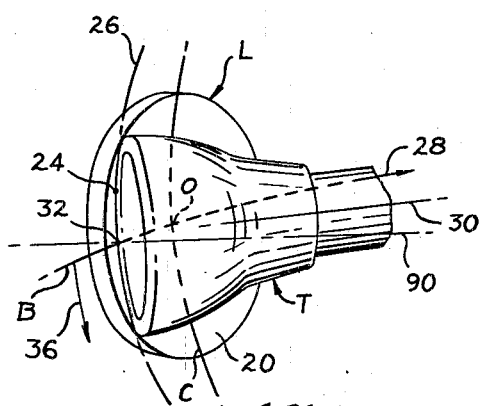
Fig. 5
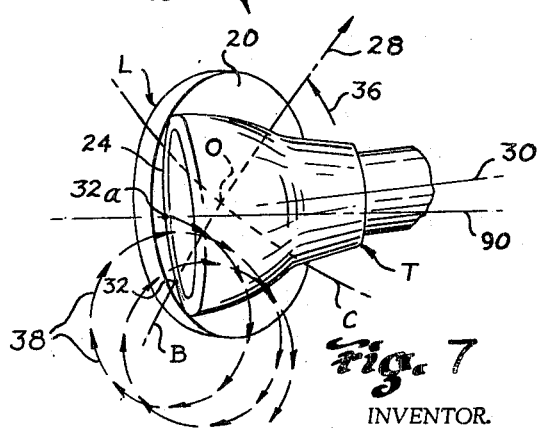
Fig. 6
Fig. 7
INVENTOR.
ERNEST T. DALTON
BY
*J. Albert Valtynt*
ATTORNEY INVENTOR.
ERNEST T. DALTON
BY J. Albert Hultquist
ATTORNEY

INVENTOR.
ERNEST T. DALTON
BY
ATTORNEY

Feb. 3, 1970    E. T. DALTON    3,492,764
LENS GENERATING METHOD
Filed March 23, 1967    4 Sheets-Sheet 4

INVENTOR.
ERNEST T. DALTON
BY
ATTORNEY

_United States Patent Office_

3,492,764
Patented Feb. 3, 1970

3,492,764
LENS GENERATING METHOD
Ernest T. Dalton, Southbridge, Mass., assignor to American Optical Company, Southbridge, Mass., a voluntary association of Massachusetts
Filed Mar. 28, 1967, Ser. No. 626,448
Int. Cl. B24b 1/00, 7/00, 9/00
U.S. Cl. 51—288                              6 Claims

ABSTRACT OF THE DISCLOSURE

Generating surfaces of ophthalmic lenses to true toric shape using a cupped generating tool universally adaptable to the production of lenses of different refractive powers.

BACKGROUND OF THE INVENTION

Field of the invention

Generating prescriptive curvatures on ophthalmic lenses with particular relationship to improvements in apparatus and method for producing a true toric ophthalmic lens surface. That is, a toric lens surface which is free of error of ellipticity in curvature.

Description of prior art

Heretofore, toric lens surfaces have been ground with tools having their abrading faces individually preformed to the curvatures of one or both of the major meridians of a desired tore. With such tools engaging a lens surface and moved relative thereto abrasion of the lens surface is effected causing the surface to assume substantially the preformed shape of the abrading face. Whether the tools are in the form of grinding laps having preformed toric abrading faces as in prior art Patent 2,179,008 or 2,168,843 for example, or cupped generating tools having abrading edges spherically shaped to the curvature desired along only one meridian of the tore to be produced as, for example, in prior art Patent 3,117,396, manufacturers are hampered by the need to stock, service and replace at considerable expense and inconvenience, great numbers of tools in order to meet the requirement of a different tool being needed to produce each and every one of the great multiplicity of different toric refractive powers which are prescribed by practitioners according to individual needs of their patients.

In another aspect of toric lens generating, the prior art has incorporated a so-called "universal" toric generating tool and associated apparatus wherewith toric lens surfaces of different and/or any desired combination of curvatures in major meridians of their surfaces may be generated with the one tool.

Exemplary of the latter system is prior art Patent No. 2,548,418. This patent shows that by presenting an edge of a cupped abrading tool at any one of various preselected angles relative to a lens surface and sweeping this edge arcuately across the lens surface along paths of any one of different preselected radii of curvature, a toric surface will be produced. The angle of presentation of the tool of the lens and radius of sweep are determinative of the refractive powers of the resulting toric lens and are selected accordingly.

This manner of toric lens generating, however, does not of itself produce true toric surfaces. The edge of the angularly disposed cupped tool, as it is presented to the lens, is inherently elliptical in shape and thus produces undesirable ellipticity in the curvature along one meridian of the lens. This is commonly referred to in the art as "elliptical error" and requires correction which involves a follow-up grinding operation commonly referred to as a "truing" operation. Truing is usually effected by lapping the lens surface until the error of ellipticity is removed. Thus, the requirement for stocking and servicing great numbers of individually preformed laps and loose abrasives, this time used for truing operations, is not avoided.

In place of the truing laps and operations involving the need for same, a form of toric lens truing during generating with a universal tool has been employed heretofore as evidenced by Patent No. 2,633,675 for example. This, however, involves cumbersome apparatus for oscillating the generating tool or the workpiece while generation of the toric surface is being effected. It also produces a grinding pattern of generally parallel grooves or ridges on the lens surface which are very difficult to remove. Such a grinding pattern, imposes upon the manufacturer the requirement for lengthy and consequently uneconomical fine grinding and polishing operations in preparing the generated surface for ophthalmic use. Thus, again, there is the need for great numbers of individually preformed fine grinding and polishing laps.

SUMMARY OF THE INVENTION

This invention provides improvements in the field of toric lens generating which renders it now possible to produce in a single simple and economical generating operation, a toric lens surface of any desired true curvature.

The term "true" as used herein, particularly in such phrases as—true toric curvature—or—true toric surface(s)—, is to be interpreted as meaning that the toric surface or tore being referred to is spherical (in the sense that the term applies to coordinates) and not elliptical or otherwise aspheric from edge-to-edge along each of its two major meridians and along all other meridians respectively parallel to said major meridians.

The aforesaid major meridians are commonly referred to in the lens art as being the "base" meridian and "cylinder" meridian and will be referred to hereinafter as such. These meridians are right angularly related to each other and form the optical center of the lens at their intersection. The base meridian is distinguishable from the cylinder meridian in that it, the former, is of longer radius of curvature. The curvature in any part of the lens measured in the direction of the base meridian is commonly referred to as the "base curve" of the lens and the curvature of the lens measured in the direction of the cylinder meridian is referred to as the cylinder curve of the lens.

The present invention utilizes a cupped generating tool having an annular abrading face containing diamond and/or other abrasive particles and a traveling work (lens) holder carried in an axially rotatable adaptor.

The work holder is arranged to travel diametrically across the adapter along an arcuate path of such preselected radius of curvature that the surface of the lens carried thereby and to be worked upon traverses the abrading face of the tool arcuately along a radius of curvature equal to that desired of the base curvature of the lens.

The cupped tool is angled relative to the axis of the adaptor to such degree that an edge of the annular face of the tool presents an effective abrading surface of substantially the curvature desired along the cylinder meridian of the lens. This curvature, being produced by angling the annular abrading face of the tool, is inherently elliptical in shape wherein only its very centermost portion is non-elliptical or true. This centermost portion of the effective abrading edge of the tool is positioned in line with the axis of the rotatable adaptor.

With the tool so angled and brought into abrading relationship with the lens, or vice-versa, generation of a true toric curvature on the surface of the lens is effected according to principles of the invention as follows:

The effective abrading edge of the tool above and below its centermost point of contact with the lens surface grinds to a depth into said surface no greater than that of the cylinder curve, i.e. less than that required to produce the base curve of the lens. The base curve is, however, ground to its shape and depth by the centermost contact point of the abrading edge of the tool as the lens is moved transversely of the adaptor.

The tool is rotated about its axis to prevent uneven wear and/or blunting of its effective abrading face and also to enhance the cutting or abrading action thereof on the lens. At the same time, the lens, which is prevented from rotating in the adaptor, is slowly moved diametrically across the adaptor thereby passing across the effective abrading face of the tool from one of its (the lens') sides to its center and thence to its opposite side. Simultaneously with such transverse movement of the lens, which generates its base curvature, the lens is revolved about a continuous succession of points all lying in the plane of motion at said lens along the diameter of said adaptor. This revolving of the lens as it slowly traverses across the adaptor produces a true cylinder curvature in all meridians normal to the base meridian.

The lens, in traversing from one of its sides to its center and thence to its opposite side across the effective abrading edge of the tool, follows a generally spiralled abrading path relative to each point on the effective abrading edge of the tool. The convolutions of all such paths continually cross each other as surface generation takes place thereby ultimately producing a uniformly grained surface, the texture of which is determined primarily by the coarseness of abrasive means used in the structure of the tool. This affect of texturing a ground lens surface is referred to in the lens grinding art as "cross-cutting."

The above described arrangement of tool and work holder may, of course, be reversed in the sense that the tool may be carried by the rotatable adaptor and caused to travel in a path lying in the plane of a diameter of the adaptor while the lens is held in the same angular relationship to the tool as was heretofore described. In this case, the principles of operation and end result will be the same as described above since it matters not whether it is the tool or the work piece (lens) that is revolved and moved in the diametral path across the adaptor.

In the present process, the aforementioned cross-cutting on the surface of the lens obviates the occurrence of regular grinding marks (parallel ridges or grooves) on the generated surface. It produces a grained, not ridged, surface texture which is suitable for immediate polishing, i.e. without intermediate steps of fine grinding.

Furthermore, the present invention contemplates polishing of the generated toric surfaces by simple repetition of the generating procedure using the same or another similar tool having on, or as a part of, its effective abrading face a conventional plastic, fabric or felted polishing medium or a medium supporting ultra fine diamond particles. In any such case, polishing of toric surfaces of all refractive powers may be effected with a single tool properly angularly presented to the toric surface. Thus, the present invention additionally features polishing with a universal polishing tool which obviates the current need for a great multiplicity of individually preformed polishing tools.

The invention will be more fully understood by reference to the following detailed description and the accompanying drawings:

DESCRIPTION OF THE DRAWINGS

FIGS. 1 and 2 each illustrate, in perspective, a toric lens which is exemplary of a particular type intended to be formed according to the present inventive concept;

FIGS. 3 to 7 inclusive are diagrammatic illustrations, in perspective, of a lens and cupped abrading tool depicting details of the operation involved in generating a true toric surface on the lens according to principles of this invention;

DESCRIPTION OF THE PREFERRED EMBODIMENT

Figure 8:
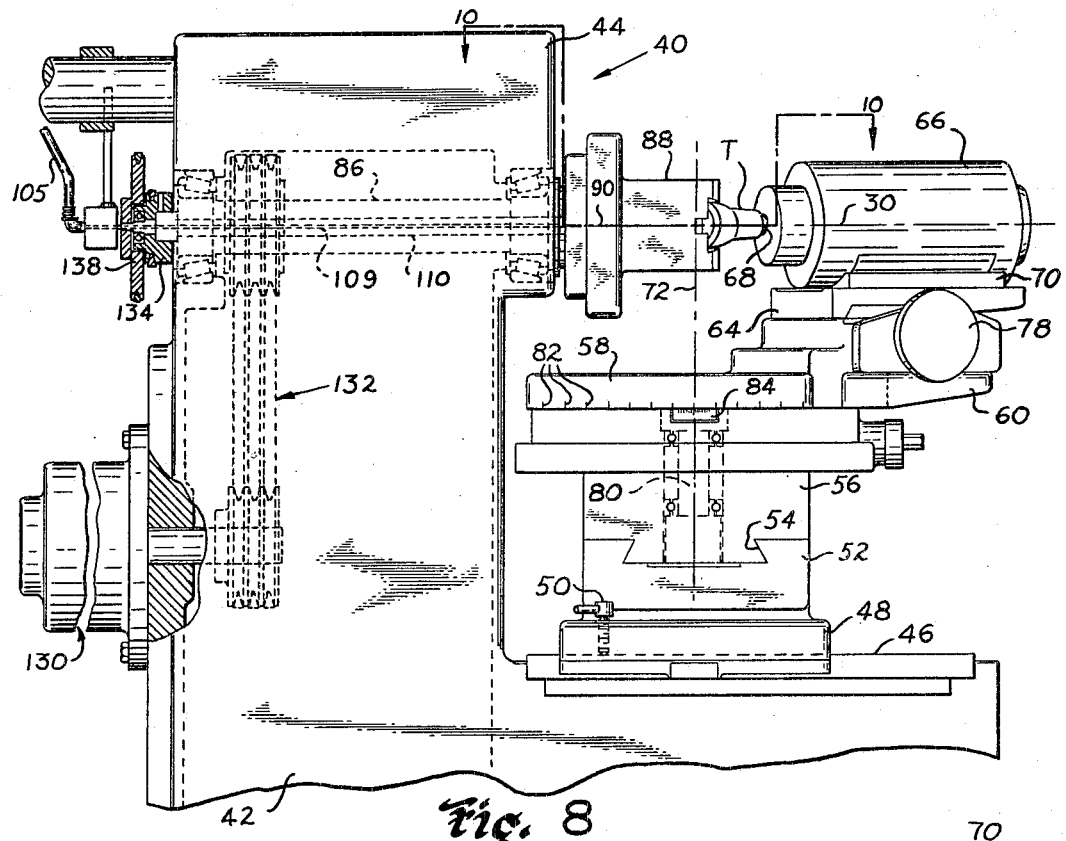
FIGS. 8 and 9 are fragmentary side elevational and plan views respectively of an embodiment of apparatus for effecting the operation illustrated in FIGS. 3 to 7.

In FIG. 1 there is shown toric lens L which is typical of one type intended to be produced according to principles of this invention. Lens L, since it has its concave side 20 shaped to the configuration of a tore, is of the type commonly referred to in the ophthalmic lens art as a "negative toric." Lens L, accordingly, has base and cylinder major meridians B and C respectively which are disposed in right-angular relationship to each other and form, at their intersection, optical center O of the lens.

Surface 20 of lens L which, according to the present invention, is formed to a true toric curvature is spherical and not elliptical or otherwise aspheric from edge-to-edge along each of its base and cylinder meridians B and C respectively and also along all other meridians respectively parallel to the major meridians B and C. A few of said other meridians are illustrated and designated as $b$ and $c$.

While method and apparatus for producing negative toric lens L will be featured in the following description, it will become apparent that the convex side 20' of a lens such as L' (FIG. 2) may, according to principles of this invention, be formed, with equal facility, to a true toric curvature. Lens L' is of the type referred to in the art as a "positive toric." It has convex base and cylinder meridians B' and C' which are spherical (i.e. non-elliptical or non-aspheric) as are all others $b'$ and $c'$ which are respectively parallel thereto. It would still be thus referred to even if the concave face of the lens had such curvature as to result in the combinations being of negative power.

PRINCIPLES OF OPERATION

FIGS. 3–7 diagrammatically illustrate principles of the present invention concept in generating true toric lens curvatures. In these figures and those immediately following of an actual embodiment of apparatus, the generating of toric surface 20 of lens L is illustrated.

In FIG. 3, universal cupped tool T of conventional design having annular rounded abrading face 22, is angled relative to surface 20 to such a degree (angle α) that the side of tool T against lens L presents to surface 20 an effective abrading edge 24 of approximately the curvature desired of cylinder meridian C to be produced on the lens. Angle α is determined from the well-known relationship wherein sin α equals the mean radius $R_1$ of face 22 (see FIG. 10) divided by the radius of curvature $R_2$ (see FIG. 11) desired of cylinder meridian C minus the radius of curvature $R_3$ (FIG. 10) of rounded face 22; or, sin $\alpha = R_1/x$ in FIG. 10. This arrangement for setting a universal cupped abrading tool in the generating of various surface curvatures therewith is well known in the art as evidenced in the aforementioned prior art Patent No. 2,548,418. It will be noted, however, that edge 24 of tool T so presented to lens L is not of spherical (i.e. of true curvature) in that it is elliptical as illustrated by line 26 (FIG. 3). That is, it is of shorter radius of curvature at each side of its centermost point of contact with the lens than it is at and near said centermost point. Accordingly, if lens L is simply swung about an arc of the desired radius of curvature of base meridian B as has been the practice heretofore (with the lens and tool in abrading relationship) a toric surface curvature will be generated on surface 20 which has elliptical error in all but the very centermost portion of its cylinder curvature (i.e. cylinder meridian C and all other meridians parallel thereto).

However, as it is well known in the art of grinding not toric but spherical surfaces with angled cupped abrading tools, true spherical curvatures can be generated by sweeping or feeding the annular effective abrading face of the tool across a len surface, or the surface across the face of the tool, about a radius of curvature equal to that desired of the spherical curvature. In order that the lens surface not assume the elliptical shape of the effective abrading edge of the angled tool in meridians normal to the direction of sweep, the lens must be continually rotated about its axis so that the centermost point of contact of the tool with the lens surface will ultimately engage every point on said surface. In so doing, the centermost point of contact of the tool along any given meridian across a lens is, as already mentioned, of the true spherical curvature desired and true (i.e. grinds away) the ellipticity of curvature in meridians normal to the direction of sweep. This principle of generating true spherical curvatures is incorporated in the present inventive concept which deals with the generating of true toric curvatures but only to the extent that it is the centermost point of contact of the tool in any given meridian across the lens (i.e. along the instantaneous effective abrading edge of the tool) that grinds away the elliptical error in the cylinder curve of the toric lens. Thus, the cylinder curve of the tore is trued. In the present case, the lens is not and cannot be continually rotated about its fixed control axis during generating.

In this invention, lens blank L is swung (actually fed slowly) across edge 24 laterally as indicated by arrow 28 along an arcuate path of the curvature desired of the base meridian B and only in the direction of meridian B. With tool T rotated at high speed about its axis 30 as is customary in all generating operations for the reasons already mentioned, lens L is revolved without rotation, about a point 32 on axis 90 as the aforesaid lateral movement of lens L is effected.

It is particularly pointed out that the term "revolved" as used herein has special significance in that it is intended to differentiate from the term "rotate" also used herein. This also holds for the various tenses of both terms. In reference to motion imparted to lenses referred to in this specification, the term "rotate" is intended to mean the impartation of rotary or spinning motion of a lens about its central axis. The term "revolve" is intended to refer to a rotary motion carrying or orbiting the lens around any given axis or point with or without rotation of the lens about its axis. In this invention, rotation of the lens occurs only at one and absolutely no other point during the aforesaid transverse movement thereof. This one point, as it will become readily apparent hereinafter, is that where the axis of the lens and one of points 32 on axis 90 about which the lens is revolved become coincident with each other. However the rotation at that point cannot affect the lens curvatures remote from such point because these portions are not in contact with the tool.

The effect of revolving lens L is illustrated diagrammatically in FIGS. 4, 5, 6 and 7.

In considering FIGS. 4–7 it should first be understood that the generating of surface 20 of lens L actually begins with the effective abrading edge of tool T engaging lens L at the very edge of lens L, e.g. point 34 (FIG. 3), and by the aforesaid lateral feed in the direction of arrow 28 it is caused to proceed across meridian B to center O of the lens (i.e. to the position illustrated in FIG. 3) and thence the rest of the way; across the lens to its opposite edge.

The lateral feed of lens L, being at all times directed arcuately in the direction of base meridian B (see arrow 28) about a radius of curvature equal to that desired of the base curve of the tore, causes the base curve to be generated to true curvature by contact between tool T and lens L along a line or succession of adjoining points 32 all across base meridian B. A true spherical curvature in the direction of cylinder meridian C is simultaneously generated. However, the base meridian of lens L is generated to a curvature of longer radius (shallower curvature) than the cylinder meridian due to the aforesaid lateral feed so that portions of the effective abrading edge of tool T at each side of all contact points 32 made by tool T on meridian B do not abrade to the depth of meridian B when passing thereover.

For ease and clarity of illustration, FIGS. 4, 5, 6 and 7 diagrammatically depict the effect produced by revolving lens L about a selection of the successive points 32 at stages subsequent to the time when the generating operation has progressed a distance (FIG. 4) beyond center O of the lens. At the instant lens L assumes the position illustrated in FIG. 4, surface 20 is ground at point 32 to the depth required of base meridian B. However, at each side thereof, in directions perpendicular to meridian B, it is ground to the elliptical curvature (line 26) of abrading edge 24 producing nearly the cylinder curvature desired but with elliptical error therein. This elliptical error is removed (i.e. gound away) when the generating has progressed to the stage illustrated in FIG. 7 which will be described in detail immediately following a description of intermediate stages of the generating operation which are illustrated in FIGS. 5 and 6.

In FIG. 5 lens L is shown as having been revolved counterclockwise about point 32 (i.e. in the direction of arrow 36) through an angle of 90° from the position illustrated in FIG. 4. Point 32 being on axis 90 which intersects base meridian B, can be seen in FIG. 5 as now comprising substantially the only portion of abrading edge 24 of tool T engaging lens surface 20. Thus, the base curvature of surface 20, being generated at point 32 by lateral feed of lens L in the direction of base meridian B (see arrow 28) is unaffected by the different curvature (line 26) of edge 24 of tool T.

FIG. 6 illustrates lens L as having been revolved in the direction of arrow 36 an additional 90° about point 32 (i.e. 180° from the position of FIG. 4). Point 32, still being on base meridian B, as it is throughout the entire generating operation, is again, as in FIG. 4, the only point of edge 24 of tool T, which, at this stage, is actually generating a true cylinder curvature in meridians normal to base meridian B. Portions of edge 24 above and below point 32 do, however generate a line of cylinder curvature (line 26) nearly true but not without the aforementioned error of ellipticity.

This error of ellipticity in the cylinder curvature of surface 20 is removed (ground away) or trued at each increment of the next 360 degrees of revolution of lens L in the manner illustrated in FIG. 7.

In FIG. 7 this next 360° revolution of lens L about point 32 on axis 90 is, for purposes of illustration only, shown as having progressed 45° beyond the FIG. 6 stage (see arrow 36 in FIG. 7). Under this condition, while point 32 about which lens L is revolved remains on axis 90 which intersects meridian B, the effective abrading edge 24 of tool T is presented to surface 20 along a line extending diagonally from meridian B to meridian C, i.e. not perpendicular to meridian B but at 45° relative thereto. Thus, the very centermost portion or point of the now effective abrading portion of edge 24 is point 32a and point 32a has become the only portion of edge 24 which at this time is of the true cylinder curvature desired of surface 20. This centermost portion of edge 24, i.e. point 32a, grinds away elliptical error (excess glass) between meridians B and C so as to true the cylinder curvature of surface 20. As point 32a follows substantially the path of arrows 38 during still further rotation of lens L about point 32 on axis 90, the same effect of truing surface 20 takes place along said path.

It should now be possible to envision the aforesaid truing affect as taking place continually across surface 20 of lens L from edge-to-edge thereof as lens L is fed transversely in the direction of arrow 28 along meridian B and simultaneously revolved about one of the succession of points 32 which is always located on axis 90 which intersects meridian B. The engagement of tool T at all points 32 along meridian B generates (grinds) the true base curve into surfce 20. Points such 32a (always the mid-point of the particular span of abrading edge 24 engaging surface 20 at each position of its angulation relative to meridian B) generate (grind) the true cylinder curvature into surface 20. It is emphasized that the effective abrading edge of tool T is, as it is presented to lens L at all times during the generating operation, of shorter radius of curvature than that desired of the base curvature and, accordingly, does not affect portions of the lens which are being generated to the longer radius of base curvature.

As already mentioned in the foregoing summary of the invention, the combined effect of revolving lens L and simultaneously moving it transversely across tool T causes all grinding points of true cylinder curvature such as 32a to travel generally spirally over surface 20 in the manner illustrated by arrows 38. Due to the fact that the lens is fed slowly in the direction of arrow 28 and revolved relatively rapidly, the pitch of convolutions of spiraling is actually very slight and consequently the convolutions are not as widely spaced as shown in FIG. 7. They are actually in immediate side-by-side relationship. The convolutions represented by the path of arrows 38 are to be considered as being only diagrammatically illustrative of the aforesaid truing and cross-cutting action effected during the surface generating operations. These convolutions continually cross each other so as to produce a uniformly grained (not ridged or grooved) surface texture having a degree of smoothness determined by the particular particle size or coarseness of the abrasive medium (diamond particles or emery and the like) used to form abrading face 22 of tool T. Thus, the generated surface 20 is immediately ready for polishing and unless extra coarse abrasive medium is used, which has been proven not to be necessary, no fine grinding operations between generating and polishing are required. If, for any reason, it is desired to perform a fine grinding operation, it may be effected simply by substituting a fine grinding tool for tool T and repeating the above described generating procedure.

APPARATUS

Application of the aforesaid principles of operation are illustrated in FIGS. 8–14 wherein there is shown an embodiment of apparatus 40 which was actually successfully tested and is currently being used.

Figure 9:
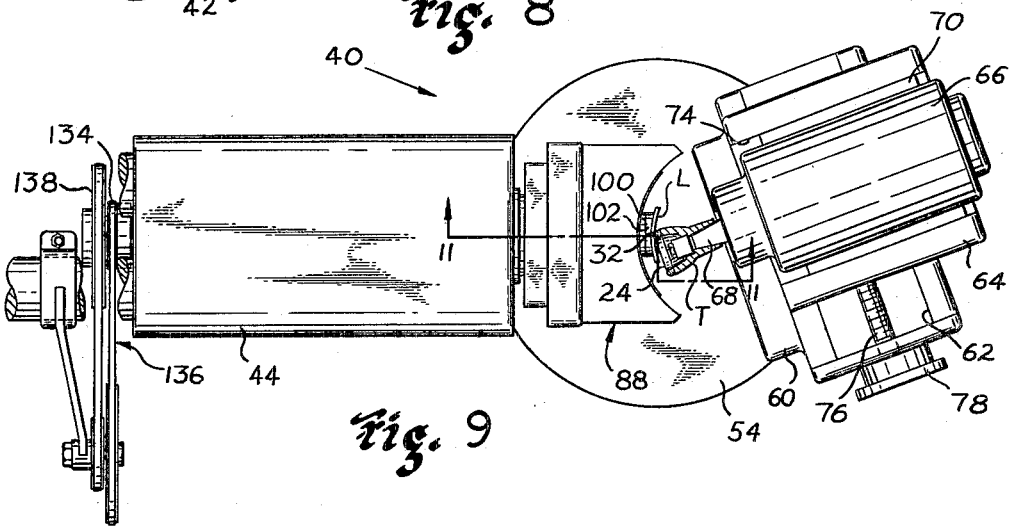

In FIGS. 8 and 9, lens generating apparatus 40 is illustrated in fragmentary elevational and plan views respectively. It comprises base portion 42 and upstanding head portion 44 hereinafter referred to as base 42 and head 44.

Base 42 includes bed 46 upon which slide 48 is movable toward and away from head 44. Slide 48 is adapted to be selectively locked at preselected positions of adjustment on bed 46 by means of locking screw 50. Slide 48 carries block 52 having transverse slideway 54 within which dovetailed slide 56 is slidably adjustable relative to head 44 in a direction normal to that of slide 44 on bed 46. Pivotally mounted on dovetailed slide 56 is turntable 58 having lateral extension 60. Extension 60 has slideway 62 (see FIG. 9) carrying cross-slide 64 upon which electric motor 66 is fixedly mounted. Tool T is carried by motor shaft 68. Motor mount 70 is rendered slidably adjustable on cross-slide 64 in a direction normal to that of slideway 62 so as to facilitate placing the center-of-curvature 33 of the rounded effective abrading edge 24 of tool T (see FIG. 10) in alignment with axis 72 (FIG. 8) about which turntable 58 is rotatable. Slideway 74 (FIG. 9) permits the aforesaid adjustment of motor mount 70 and adjusting screw 76 (FIG. 9), operated by knob 78, is used to adjust cross-slide 64 in bringing point 33 into alignment with axis 72.

Complete details of all means for operating the various slides and turntable 58 and for locking each at desired settings of adjustment are omitted from the present drawings since this involves no more than simple mechanical expedients well known and understood by an artisan.

Figure 10:
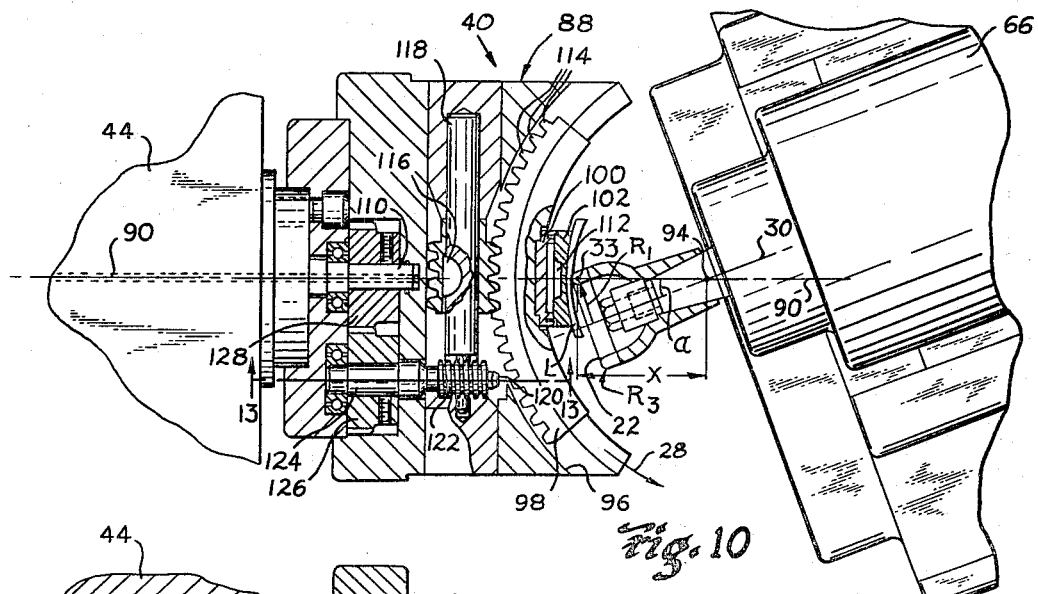
FIG. 10 is an enlarged fragmentary partially cross-sectioned view of the aforesaid apparatus taken generally along line 10—10 of FIG. 8.
Figure 11:
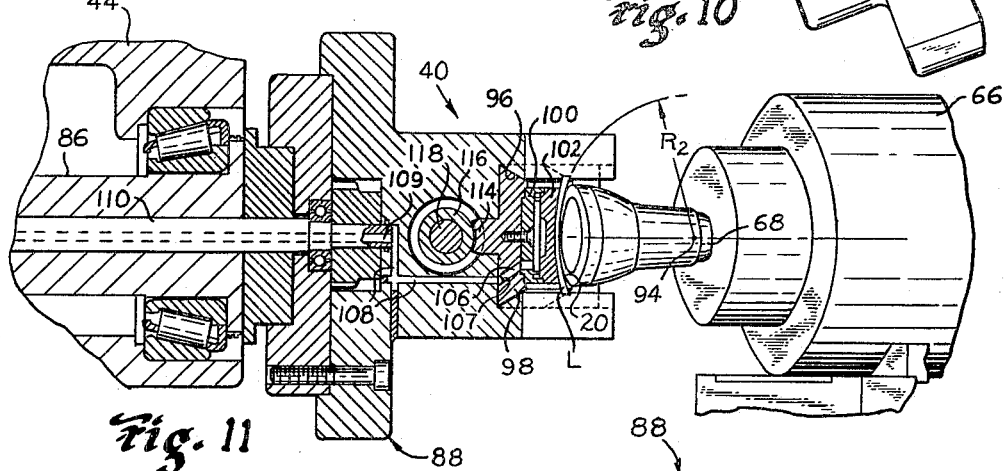
FIG. 11 is a similarly enlarged fragmentary partially cross-sectioned view of the same apparatus taken along line 11—11 of FIG. 9.

Angulation of tool T relative to lens L in the manner set forth hereinabove (i.e. setting the axis of tool T at angle α as shown in FIGS. 3, 10 and 11) is effected by rotating turntable 58 about axis 72. Turntable 58, being designed for this purpose, has a large depending pintle 80 journaled in slide 56. Degree markings 82 on turntable 58 and stationary vernier 84 may be used to determine the extent of rotation required of turntable 58 for desired accurate settings of angle α.

Journaled in head 44 is shaft 86 (FIGS. 8 and 11) having adaptor 88 attached to its end adjacent to tool T. Axes 90 and 30 of shaft 86 and tool T respectively are coplanar (see FIGS. 8 and 10) and intersect at point 94 (FIG. 10). Adjustment of slide 56 on block 52 is used to bring axis 72 into intersecting relationship with axis 90 and adjustment of slide 48 on bed 46 is effected to bring the abrading edge of tool T into abrading relationship with lens L (e.g. to the position shown in FIG. 10).

Extending diametrically across adaptor 88 is arcuate slideway 96, best illustrated in FIGS. 10 and 11, having slide 98 of a matching radius of curvature dovetailed therein. Fixed to slide 98 is lens holder 100 which detachably receives blocked lens L.

Lens L is blocked, i.e. fixedly attached to lens block 102 (FIGS. 9, 10 and 11), prior to placement thereof in apparatus 40. A preformed block 102 of cast iron or the like to which lens L is attached with an adhesive such as pitch may be used or block 102 may be cast or molded directly upon the lens by using a low melting temperature metallic alloy which will adhere to the lens surface. Either of these techniques, both well known and commonly practiced in the art, may be used for blocking lens L.

Figure 12:
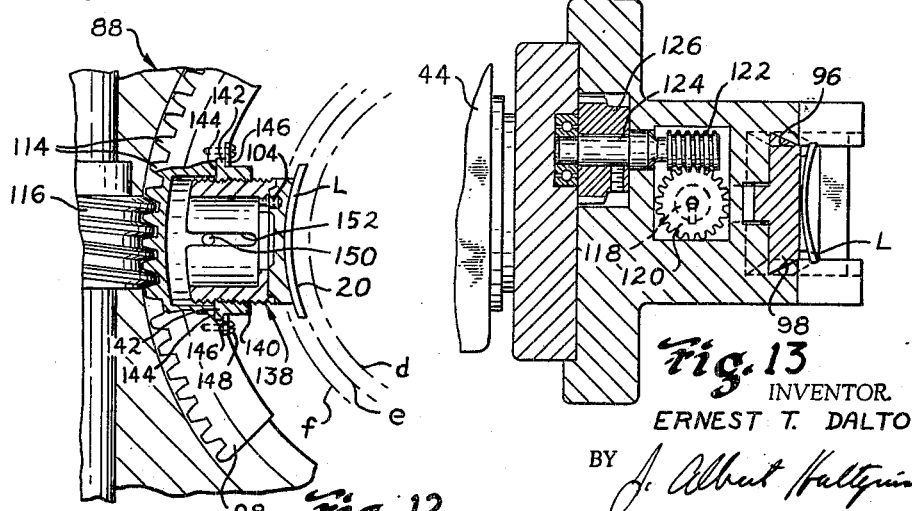
FIG. 12 is a cross-sectional view of a modification of the apparatus of FIGS. 8–11.
Figure 13:
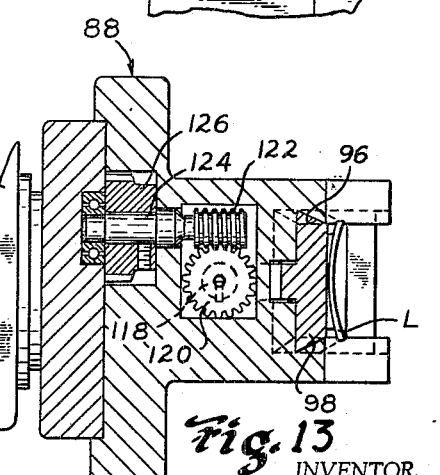
FIG. 13 is a cross-sectional view taken along line 13—13 of FIG. 10.

Block 102 is intimately received in holder 100 wherein it is keyed against rotation. The keying may be accomplished in any convenient manner such as with a pin similar to pin 104 shown in FIG. 12. FIG. 12 depicts a modified form of lens holder to be described in greater detail hereinafter.

Block 102 is held in holder 100 by vacuum. A system of passages from block 102 (FIG. 10) to vacuum line 105 (FIG. 8) is provided for this purpose. The system comprises passage 106 through holder 100 and slide 98 leading to lateral groove 107 in slide 98. Groove 107 communicates with passage 108 in adaptor 40 and passage 108 leads to passage 109 running centrally through spindle 110 and thence to vacuum line 105 (FIG. 8).

A conventional vacuum pump (not shown) is connected to line 105 wherewith the aforesaid passages and space 112 behind block 102 (FIG. 11) is evacuated of air and gases with a force sufficient to hold block 102 in place during the generating of surface 20 of lens L.

In the embodiment of apparatus 40 shown in FIGS. 8–11, the distance from surface 20 of lens L along axis 90 to slideway 96 is controlled according to the radius of curvature of slideway 96 so as to be such that when slide 98 is moved laterally in slideway 96 it will cause surface 20 to describe a curvature of a radius equal to that desired of the base curvature to be generated on lens L.

Slide 98 is similar to a peripheral segment of a worm wheel bearing teeth 114 (FIG. 10). Thus it will be seen that slide 98 is essentially an arcuate rack guided in its movement by slideway 96.

Meshing with teeth 114 is worm 116 (FIGS. 10 and 11) carried by spindle 118 journaled in adaptor 40. Worm 116, being keyed to spindle 118, is rotated through a right-angular gearing system adjacent one end of spindle 118. This comprises worm gear 120 (see FIGS. 10 and 13) keyed to spindle 118 which is driven by worm 122 on spindle 124. Planetary gears 126 and 128 interconnect spindle 124 and spindle 110. Spindle 110 extends through shaft 86 (see FIGS. 10, 11 and 13).

Movement of slide 98 is effected indirectly by rotation of shaft 86 which rotates adaptor 88 about axis 90. Transverse movement of slide 98 thus takes place simultaneously with rotation of shaft 86 as follows:

In FIG. 8 it can be seen that electric motor 130, interconnected to shaft 86 by belt and pulley system 132, drives shaft 86 causing shaft 86, adaptor 88 and pulley 134 to rotate as a given speed determined by the r.p.m. rating of motor 130 and relative sizes of pulleys selected in system 132. Spindle 110 being journaled for independent rotation in shaft 86 is rotated at a preselected slower speed than shaft 86 by a speed reduction system of belts and pulleys 136 (FIG. 9) which interconnects pulley 134 with pulley 138. Pulley 134 is fixed to shaft 86 and pulley 138 is fixed to spindle 110. Thus, adaptor 88 is rotated by shaft 86 about axis 90 while slide 96 carrying lens L is, at the same time, caused to traverse slowly diametrically across adaptor 88. The transverse movement of slide 96 results from the rotation of spindle 110 causing gear 128 to be driven which, in turn, drives gear 126 causing spindle 124 and its worm 122 to rotate. Worm 122 drives worm gear 120, spindle 118 and worm 16 which meshes with teeth 114 of slide 98.

From the foregoing it can be seen that slide 98 in apparatus 40 produces the arcuate movement of lens L in the direction of arrow 28 of FIGS. 3–7 while rotation of adaptor 88 about axis 90 during such arcuate movement causes lens L to revolve about the aforementioned point 32. Thus, the generating operation described hereinabove and illustrated in FIGS. 3–7 is affected with apparatus 40.

It will be noted however that lens holder 100, as it is shown in FIGS. 8–11, is not adjustable in length and, accordingly does not permit the generating of more than one curvature in the base meridian of lens L although any number of different curvatures in the cylinder meridian of lens L can be generated simply by setting tool T at different preselected angles α relative to axis 90.

In FIG. 12, however, a modified lens holder 138 is illustrated which may be substituted for holder 100 wherewith adjustment of lens L to settings of different distances from the arcuate path of slide 98 may be effected. Lens holder 138 is externally threaded and fixed to slide 98 through the intermediary of internally threaded adjusting ring 140 within which holder 138 is threadedly engaged. Ring 140 has flange 142 seated in recess 144 in slide 98. Annular plate 146 fitted over flange 142 and secured to slide 98 with screws 148 holds ring 140 in place. Pin 150 in slide 98 and slot 152 in holder 138 prevent holder 138 from rotating relative to slide 98 while ring 140 is free to rotate coaxially about holder 138. Adjustment of holder 138 for the purpose of placing surface 20 of lens L at different preselected distances from the arcuate path of slide 98 may be effected simply by rotating ring 140 which causes adaptor 138 to threadedly advance or retract therein.

With holder 138 (FIG. 12), apparatus 40 may be rendered universally adjustable for generating true toric surface curvatures on lens L of not only various preselected cylinder curvatures but also of various preselected base curvatures. The former, as already described is accomplished by adjusting angle α and the latter by adjusting holder 138 with ring 140. In FIG. 12, arcuate lines $d$, $e$ and $f$ represent a few of the innumerable paths of travel of surface 20 of lens L which can be effected by adjusting the length of holder 138.

It should be understood, however, that for each preselected position of adjustment of holder 138, a corresponding adjustment of tool T must be effected to bring the effective abrading edge of the tool into proper abrading relationship with surface 20 of lens L along axis 90. This, of course, is accomplished by moving slide 48 toward or away from head 44 as required.

Figure 14:
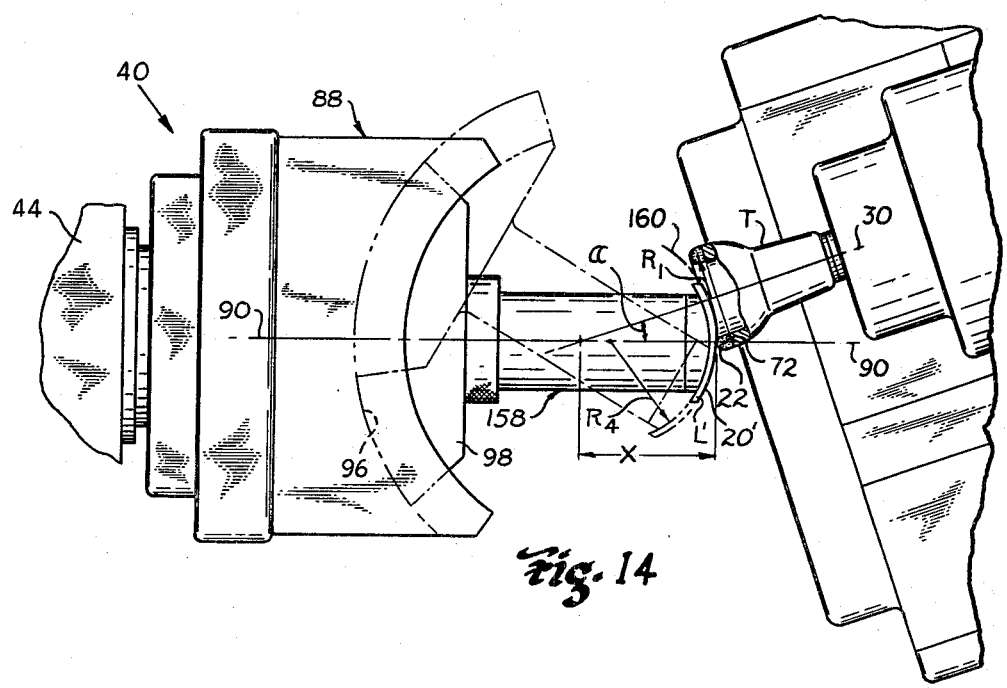
FIG. 14 is a fragmentary plan view of a further modification of the apparatus of FIGS. 8–11.

In generating true plus toric (convex) surfaces on lenses according to this invention, the principles set forth hereinabove with regard to lens L are applicable and only slight modification of apparatus 40 is required. The latter is illustrated in FIG. 14 wherein slide 98 in adaptor 88 is provided with lens holder 158. With the exception of its being of considerably greater length, lens holder 158 is identical to holder 138 in FIG. 12.

The greater length of holder 158 is such that the above described transverse arcuate movement of slide 98 in adaptor 88 causes surface 20' of lens L' to describe a curved path 160 of a radius $R_4$ equal to that desired of the cylinder curvature across meridian C' (FIG. 2) of lens L'. The extension of lens holder 158 from slide 98 is adjustable so that surface 20' of lens L' may be selectively positioned at different distances from slideway 96 in accordance with the particular radius of curvature $R_4$ desired of cylinder meridian C' of lens L'. Lens holder 158 may, if desired, be of the less complex nonadjustable type shown in FIGS. 10 and 11 except for its being of greater length.

As it is customary in generating plus (convex) surfaces on lenses with angled cupped abrading tools, the inner, rather than outer, portion of the annular abrading face of the tool is used. Thus, in the case of this latter embodiment of the present invention, tool T is set relative to axis 90 at angle α in the manner illustrated in FIG. 14. Angle α being determinative of the curvature to be generated on lens L' in the direction of base meridian B' (FIG. 2) is set precisely according to the procedure described above in relation to FIGS. 10 and 11 (i.e. $\sin \alpha = R_1/x$). The distance $x$ in this case is the radius of curvature desired of the base curvature of lens L' minus the small radius of curvature of rounded face 22 of tool T.

With tool T rotating about its axis 30 and adaptor 88 about its axis 90 (the latter causing slide 98 to move diametrically across adaptor 88 as illustrated by the dot-dash outline of slide 98 and holder 158) generation of a true toric curvature on surface 20' of lens L' is accomplished.

In the above described generating operations, typical but not in any sense restrictive of rates of rotation of adaptor 88 and tool T and travel of slide 98 are 150 revolutions per minute, 10,000 revolutions per minute and 2.5 inches per minute respectively. Also typical of a desirable diamond or other abrasive particle size suitable for use in generating a glass lens surface which is adaptable to immediate polishing is 125 microns.

Figure 15:
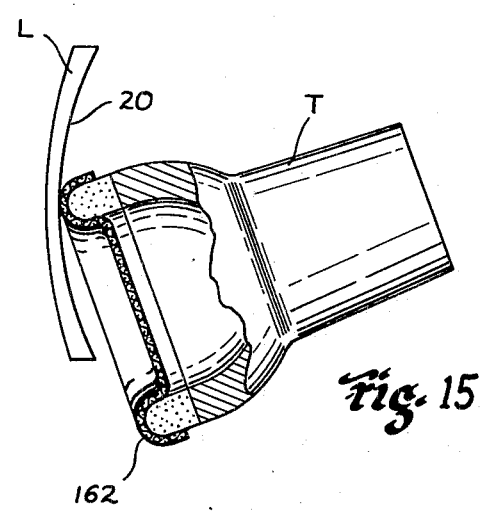
FIG. 15 illustrates, in cross-section, still another modification of said apparatus.

Polishing of either surface 20 of lens L or surface 20' of lens L' may be accomplished by substituting for tool T a similar tool differing only in that its abrasive (e.g. diamond) particle size is ultra fine. Diamond particles in the order of 2 microns in size are known to produce high quality optical finishes. Alternatively, the annular abrading face of tool T may be simply covered with or formed of felt, fabric, plastic, leather or any suitable polishing pad material 162 (FIG. 15) and the operations used to generate the aforementioned toric surfaces 20 and 20' repeated while a conventional polishing slurry is continually applied to material 162.

From the foregoing, it can be seen that the present invention uniquely provides for generating and also polishing true toric ophthalmic lens surfaces of any desired curvature and combinations thereof in base and cylinder meridians with a single, i.e. universal, tool.

What is claimed is:

1. The method of producing a true toric ophthalmic lens using a cupped abrading tool having an annular abrading edge in concentric relation to the axis of said abrading tool, said method comprising the steps of:

so disposing said tool relative to a surface of said lens as to present said abrading edge to said lens surface with said edge approximating the curvature desired along a first major meridian of the lens;

rotating said tool about its axis;

bringing said abrading edge and said surface of said lens into abrading relationship with each other;

moving said lense and said abrading edge one relative to the other along an arcuate path directed across said surface of said lens along a second major meridian thereof, said path being of a radius of curvature equal to that desired along said second major meridian; and while said tool is rotating about its axis;

revolving said lens and said tool one relative to the other about each of a continuous succession of points across said surface of said lens along said second major meridian with said revolution taking place about a second axis intersecting said arcuate path and occurring relative to said points as each assumes a position of coincidence with said second axis during said movement of said lens and tool one relative to the other, said second axis and the axis of said tool being coplanar and in intersecting relationship with each other at the center of said curvature desired along said first major meridian, whereby said tool rotation and said action of revolving will jointly true the curvature along said first major meridian and produce said true toric lens.

2. The method as recited in claim 1 wherein said first major meridian is the cylinder meridian of said true toric ophthalmic lens.

3. The method as recited in claim 1 wherein said first major meridian is the base meridian of said true toric ophthalmic lens.

4. The method as recited in claim 1 wherein said lens is revolved relative to said tool.

5. The method as recited in claim 1 wherein said tool is revolved relative to said lens.

6. The method as recited in claim 1 wherein the directions of said arcuate path and second major meridian are parallel and are continuously held in such relationship during said transverse movement and revolution of said lens and tool one relative to the other.

References Cited

UNITED STATES PATENTS

| | | | |
|---|---|---|---|
| 1,401,832 | 12/1921 | Taylor | 51—284 |
| 1,960,291 | 5/1934 | Tauchmann | 51—127 X |
| 2,096,751 | 10/1937 | Martin | 51—284 X |
| 2,291,000 | 7/1942 | Simpson | 51—227 X |
| 2,589,488 | 3/1952 | Fowler | 51—284 X |
| 2,633,675 | 4/1953 | Ellis. | |
| 3,117,396 | 1/1964 | Dalton | 51—284 X |

HAROLD D. WHITEHEAD, Primary Examiner

U.S. Cl. X.R.

51—124